UNITED STATES PATENT OFFICE.

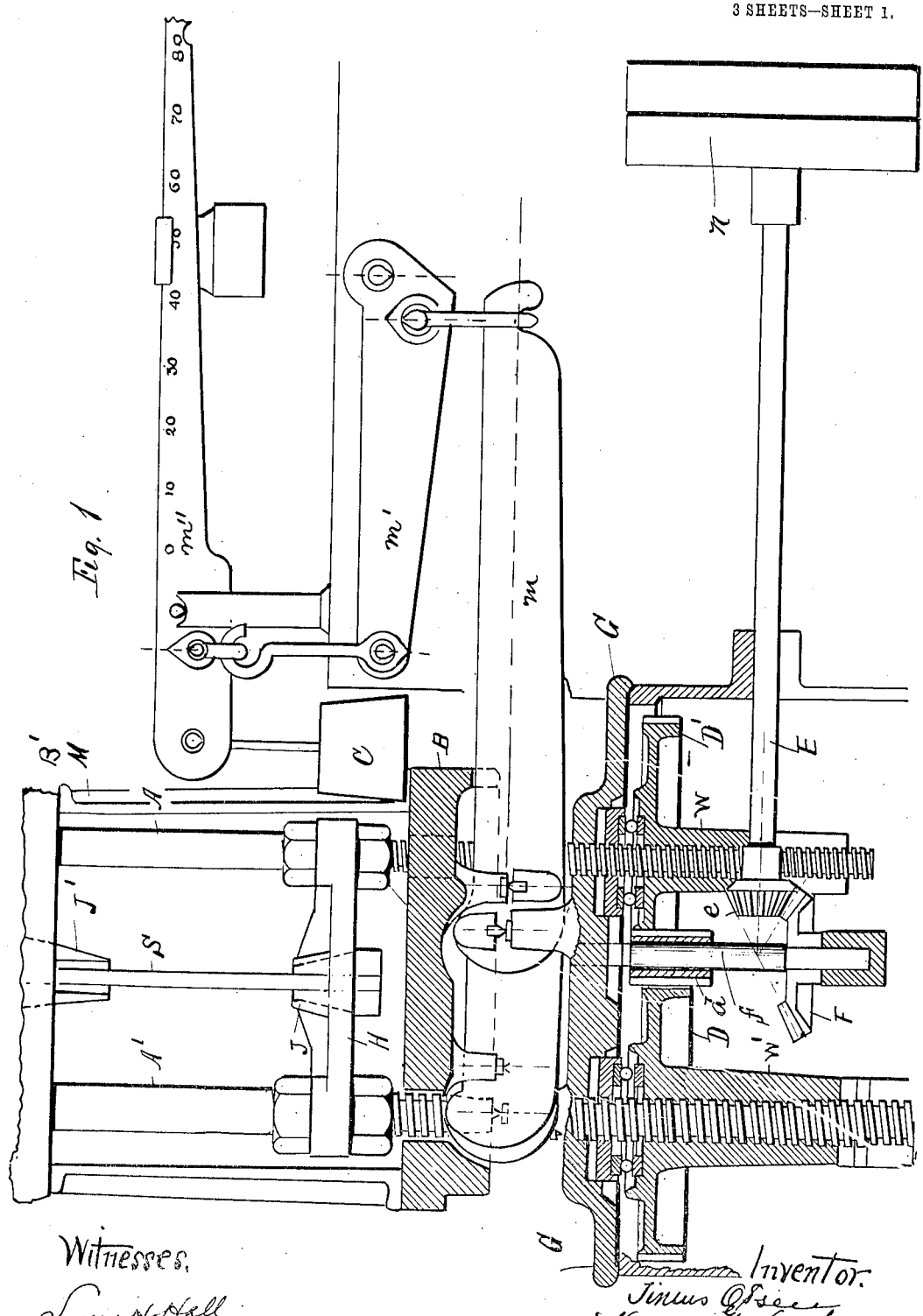

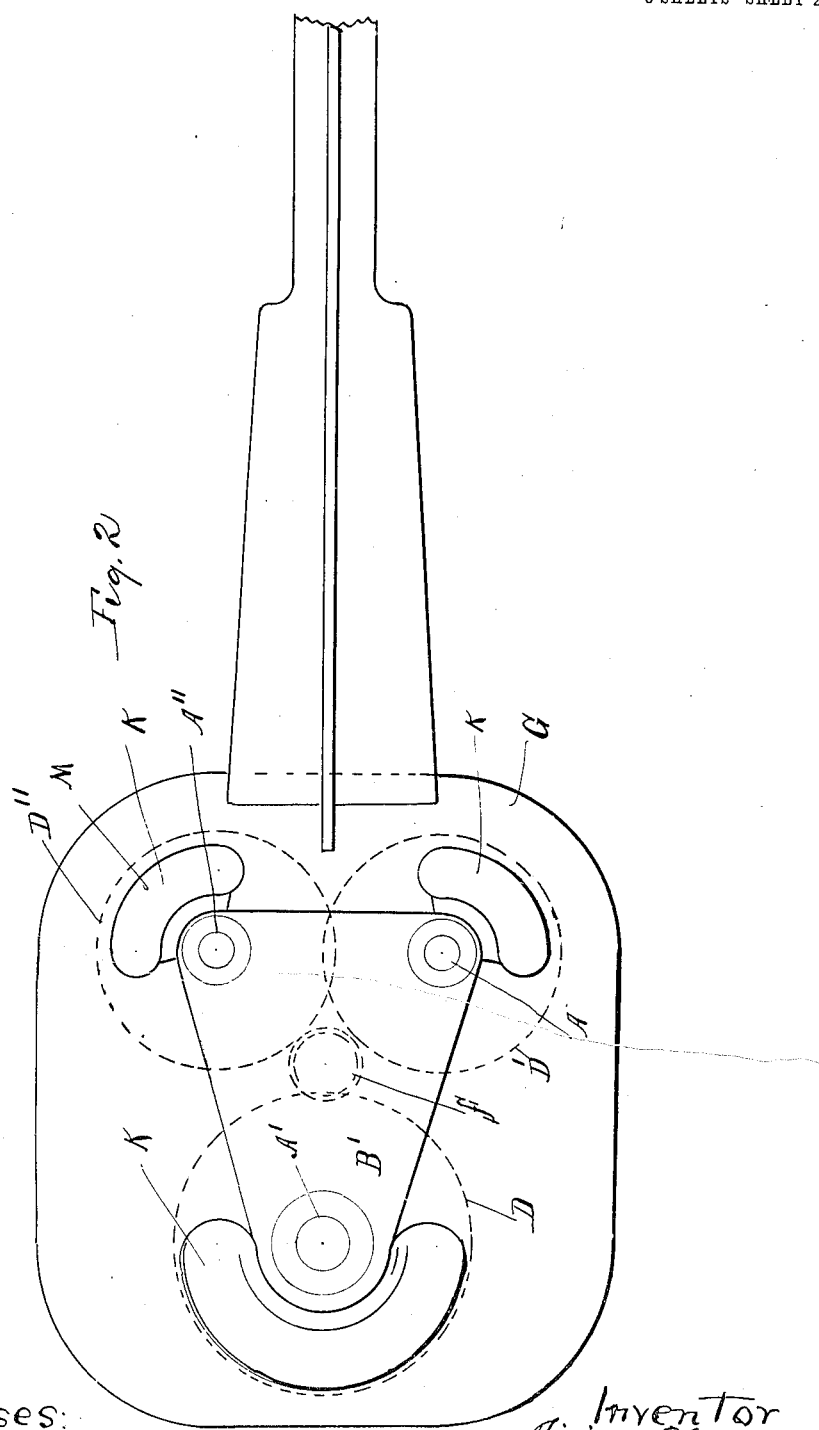

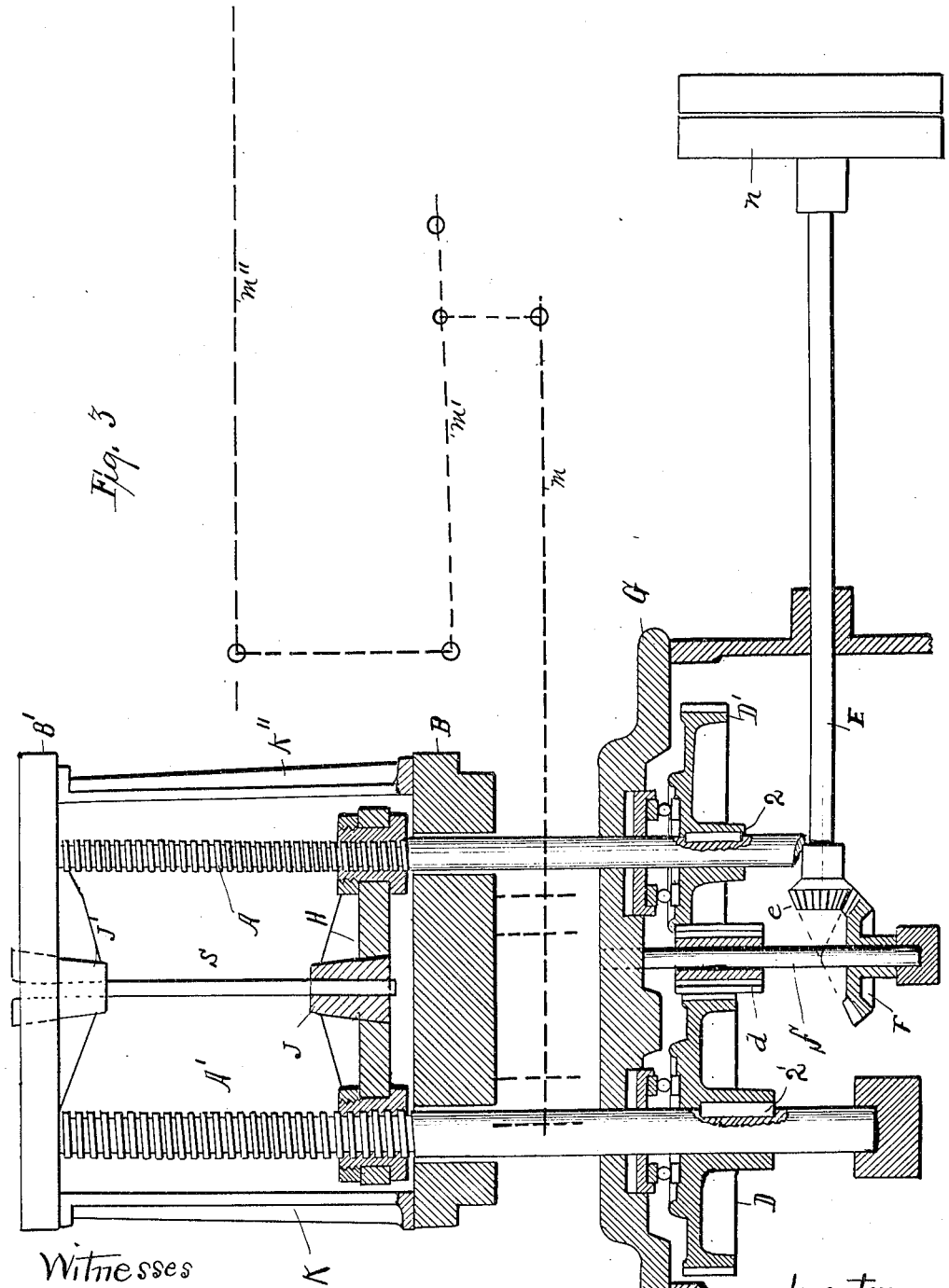

TINIUS OLSEN, OF PHILADELPHIA, PENNSYLVANIA.

TESTING-MACHINE.

No. 875,730.　　　Specification of Letters Patent.　　　Patented Jan. 7, 1908.

Application filed February 8, 1904. Serial No. 192,531.

*To all whom it may concern:*

Be it known that I, TINIUS OLSEN, a citizen of the United States, residing at Philadelphia, in the county of Philadelphia and State of Pennsylvania, have invented certain new and useful Improvements in Testing-Machines, of which the following is a specification.

My invention has reference to testing machines and consists of features fully set forth in the following specification and the accompanying drawing forming part thereof.

The object of my invention is to provide a testing machine with a simplified means to produce the force or stress, or rather with a simplified means to communicate the stress from the source of power and motion to the clamps which serve as the holders for the specimen.

It consists, in combination with the usual means for actuating the screws of three screws. Two preferably of like size and power and a third one of a different and larger size and greater power. The screws are entirely counterbalancing. They are designed to maintain a perfect horizontal parallelism in their plane of action; that is the pitch of the screws and the relative size of their actuating members is such that the plate or frame which carries the clamps for holding the specimen will maintain a perfectly horizontal position, if the machine is standing in its normal vertical position and they will always be parallel.

In the drawings like parts are referred to by marks or figures of a corresponding kind in the different views.

Figure 1 is a vertical section through the screws and their actuating gears and a side elevation of the force multiplying scale levers. Fig. 2 is a plan of the machine showing the relative sizes of the gears and the position of the screws. Fig. 3 is a modification of the form shown in Fig. 1 and is a diagram in so far as it shows the multiplying levers by dotted lines.

E is the prime shaft of the machine actuated by the belt wheel $n$. $e$ is a bevel gear actuating its follower F, shaft $f$ and pinion $d$ the latter three elements being rigidly united.

D' and D'' best shown in Fig. 2 are two spur gears of like pitch diameter. They mesh with and are actuated by the pinion $d$ and they therefore rotate the same number of revolutions in the same unit of time. As shown in Figs. 1 and 2 the screws A, and A'' are threaded into the bosses W, of the said gears D' and D'' respectively. Now as the specimen holder $j$ is fixed against any but vertical motion the rotary motion of the gears will move the screws reciprocally and thus, through the bar H, communicate stress to the specimen S. The pinion $d$ also actuates the spur gear D. This latter gear is of larger size than the gears D' and D'' aforenamed. It carries the screw A' which is actuated in the same way that the screws A and A'' are actuated by the gears D' and D''.

J and J' are the specimen holders. The latter is carried on the top plate B' and the former held to the movable frame H and this movable frame, as already stated, is carried by the screws A, A' and A''.

It is important in testing machines that the parallelism of the parts H and B' is maintained. By this arrangement the specimen is subject to no stress except that which the machine by design gives it. The even wear of the parts is also a matter of importance, alike to the life of the machine and the efficiency of its work. Both the parallelism and the even wear are more readily accomplished by the use of three screws than of four and my invention consists in providing three screws in combination with the means for actuating them. It is not material to me how the reciprocal motion of the specimen holders is communicated thereto. It matters not if the screws rotate or have a vertically rectilinear reciprocal motion, so long as three screws are employed to actuate the specimen holders it comes within the scope of my invention. It will be remembered that the screws A and A'' are of like diameter and like pitch of thread, therefore the part of the frame H carried by the said two screws will move uniformly on the rotation of the shaft E. The gears D' and D'' are also of like pitch and diameter thus giving the respective screws they actuate their proper motion.

The screw A' is of larger diameter than A and A'' and the pitch of thread is in proportion to this increased size. It bears a proportionate relation in point of size and strength to the spur gear D and this proportionate size and pitch of said screw, co-acting with the screws A and A'' and their actuating gears D' and D'' will move the specimen holding frame H in a continuous parallel position in its relation with the bar B'. The multiplying levers $m$, $m'$ and $m''$ and all the other elements of the machine are so well known that description thereof is needless. K, K are the standards for supporting the top plate B' to the scale platform B.

In Fig. 3 the screws are keyed to the gears D' and D at 2 and 2' respectively. Of course the gear D'' is also keyed, but the section, Fig. 3, will not permit the showing of this gear. The effect of this structure is to rotate the screws A' A and A'' instead of the direct reciprocal motion they receive in the arrangement shown in Fig. 1. In all other respects the parts are the same as shown in Fig. 1 and no further description is thought necessary. It will, therefore, be noted that I do not limit myself to the manner of actuating my screws whether by rotation or by vertical reciprocation.

Having now described my invention what I claim as new and desire to secure by Letters Patent is:

1. In a testing machine having two specimen holders, means for fixing one of the said holders mounted on a scale platform rigidly against vertical movement relative to the scale beams, a movable support for the other, a movable platform on which the latter is supported, means for moving the said platform and therethrough the movable holder comprising three screws of varying pitches for their threads and varying diameters for their cross sections, and means for actuating the said screws at a rate inversely proportionate to their thread pitches and diameters.

2. In a testing machine the combination of two specimen holders mounted on a scale platform, one of which is stationary as to vertical motion and one independently movable relative to the scale beam, means for actuating the said independently movable holder whereby stress is communicated to the specimen, said means consisting of three screws, said screws being of varying sizes and thread pitches and located at the vertices of an acute triangle and means for giving to the said movable holder through the said screws longitudinal motion in proportion to the thread pitches of the said screws, as and for the purpose set out.

3. In a testing machine the combination of a lower specimen holder, three screws supporting the said specimen holder, said screws located at the vertices of an acute triangle and having varying but compensating thread pitches, a scale platform, a second and upper specimen holder, standards K supporting said upper specimen holder on said scale platform, said latter supported on said scale platform through standards K therefor and means for actuating said screws inversely in proportion to their sizes and thread pitches.

4. In a testing machine the combination of a specimen holder, three screws supporting said holder, said screws being of varying sizes but compensating sizes and thread pitches, a second specimen holder supported on a scale platform and means for actuating the said screws inversely in proportion to their sizes and thread pitches.

5. In a testing machine the combination of a specimen holder, a portable support therefor, a scale platform on which the said support is mounted, three screws of varying sizes and pitches, said screws located at the vertices of a triangle whose sides are not equal, a movable specimen holder, said movable specimen holder supported on the said three screws and means for rotating the said screws inversely in proportion to their sizes and thread pitches.

6. In a testing machine the combination of a specimen holder, a support therefor comprising three screws, said screws located at the vertices of a triangle whose sides are not equal and having varying but compensating thread pitches, means for rotating said screws inversely in proportion to their sizes and thread pitches, a scale platform, a second specimen holder carried thereby through rigid connection and means for indicating or registering the power of the screw action.

In testimony whereof I affix my signature in presence of witnesses.

TINIUS OLSEN.

Witnesses:
HOMER A. HERR,
WM. F. SULLIVAN,
C. W. MCMAHON.